No. 672,108. Patented Apr. 16, 1901.
L. A. SPRAGUE.
HANDLE FOR FRUIT BASKETS.
(Application filed Feb. 4, 1901.)

(No Model.)

Witnesses:
Henry L. Deck.
E. A. Volk.

Leon A. Sprague, Inventor.
By Wilhelm Bonner
Attorneys.

THE NORRIS PETERS CO., PHOTO-LITHO., WASHINGTON, D. C.

UNITED STATES PATENT OFFICE.

LEON A. SPRAGUE, OF BROCTON, NEW YORK, ASSIGNOR OF ONE-HALF TO GARRETT E. RYCKMAN, OF SAME PLACE.

HANDLE FOR FRUIT-BASKETS.

SPECIFICATION forming part of Letters Patent No. 672,108, dated April 16, 1901.

Application filed February 4, 1901. Serial No. 45,978. (No model.)

*To all whom it may concern:*

Be it known that I, LEON A. SPRAGUE, a citizen of the United States, and a resident of Brocton, in the county of Chautauqua and State of New York, have invented a new and useful Improvement in Handles for Fruit-Baskets, of which the following is a specification.

This invention relates to that class of wire handles for fruit-baskets which are so constructed that they serve at the same time as a handle for carrying the basket and as a clamp to hold the cover down.

The object of my invention is to produce a handle of this character which can be easily applied to the basket, which is securely attached to the basket and holds the cover securely in place, and which can be produced at comparatively small cost.

Figure 1:
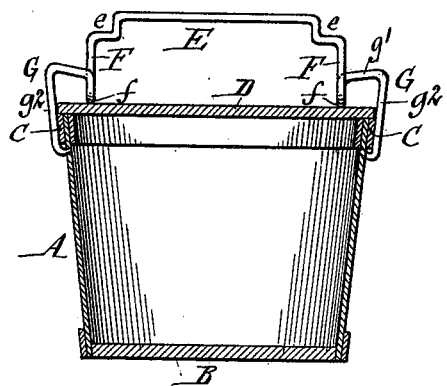
Figure 2:
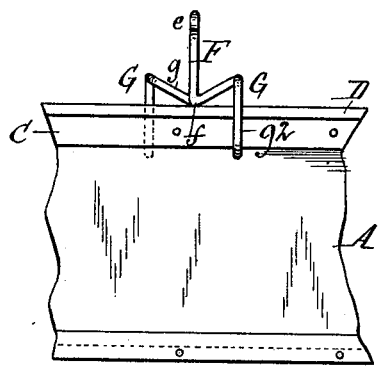
Figure 3:
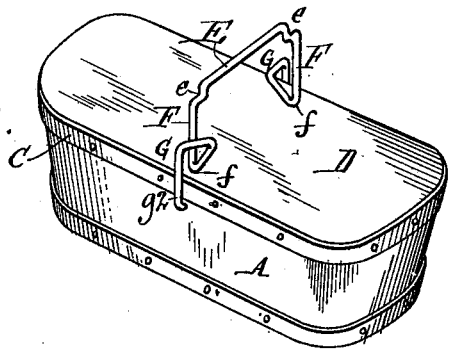
Figure 4:
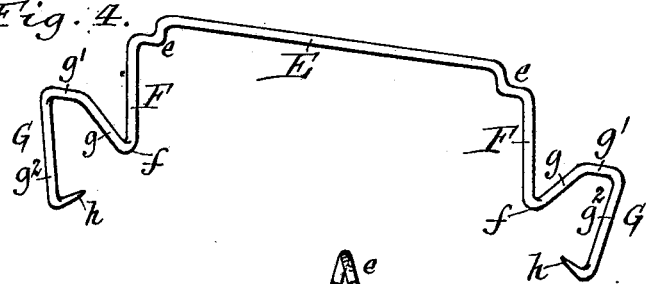
Figure 5:
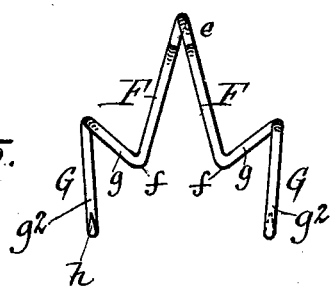

In the accompanying drawings, Figure 1 is a vertical cross-section of a fruit-basket provided with my improved handle. Fig. 2 is a fragmentary side elevation of the same. Fig. 3 is a perspective view of the same. Fig. 4 is a perspective view, on an enlarged scale, of the handle detached from the basket. Fig. 5 is a detached end view of the handle, showing its parts in the position which they assume before the handle is applied to the basket.

Like letters of reference refer to like parts in the several figures.

A represents the body of a fruit-basket of well-known construction; B, the bottom thereof; C, the external top hoop or band, secured, as usual, by tacks to the outer side of the body, and D the cover, which rests loosely upon the body.

E represents the horizontal main portion or bar of the handle, and F the upright bars which extend downwardly from the ends of the main bar. These upright bars are preferably connected with the horizontal main bar by bent corner portions $e$, which stiffen the corners. The upright bars F bear with their lower ends $f$ upon the cover, near the side edges thereof, for holding the cover down upon the body of the basket.

G represents hook-shaped end portions which extend from the lower ends of the upright bars F upwardly, outwardly, and downwardly on the outer side of the body and engage at their lower ends with the side of the body for connecting the handle thereto. Each of these end portions is composed, preferably, of an oblique bar $g$, which extends upwardly from the lower end of the upright bar F, a lateral bar $g'$, which extends outwardly from the upper end of the oblique bar, and an upright bar $g^2$, which extends downwardly from the outer end of the lateral bar and which is provided at its lower end with an inwardly-projecting point $h$, which embeds itself in the side of the basket or penetrates the same. The hook-shaped end pieces project from the upright bars F in opposite directions lengthwise of the basket—that is to say, the oblique bar $g$ of one end hook extends from its upright bar toward one end of the basket, or forwardly, and the other oblique bar toward the opposite end of the basket, or backwardly. The two upright bars F stand in different planes, diverging downwardly, as shown in Fig. 5. The several parts or bars of the handle are of bent wire or of a rod or bar possessing the requisite strength and elasticity.

The handle is applied to the basket by placing it about midway over the basket and engaging one of its points $h$ with the body at such a distance below the cover that the lower end of the adjacent upright bar F bears firmly upon the cover. The upright bar F at the opposite end of the handle and the adjacent hook portion G are then bent back toward the end which has been secured to the basket until corresponding parts at opposite ends of the handle stand about in the same vertical plane, as indicated in Figs. 2 and 3. The point $h$ at the opposite end of the handle is now driven into the body of the basket, whereby the handle is secured to the same. In this manner a torsional strain is applied to the main bar of the handle, whereby the latter is caused to bear with both upright bars F firmly upon the cover, holding the latter securely in place and holding the handle securely in an upright position.

I claim as my invention—

1. A flexible basket-handle composed of a transverse main portion, upright portions extending downwardly from the ends of the main portion and adapted to bear upon the cover, and hook-shaped end portions extending from the lower ends of the upright portions in opposite directions, one forwardly and the other backwardly from the main portion, and downwardly for engagement at their lower ends with the body of the basket, substantially as set forth.

2. A flexible basket-handle composed of a transverse main portion, upright portions extending downwardly from the ends of the main portion and adapted to bear upon the cover, said upright portions being arranged in different planes, diverging downwardly, and hook-shaped end portions extending from the lower ends of the upright portions in opposite directions, one forwardly and the other backwardly from the main portion, and downwardly for engagement at their lower ends with the body of the basket, substantially as set forth.

Witness my hand this 31st day of January, 1901.

LEON A. SPRAGUE.

Witnesses:
L. RICHARD RYCKMAN,
ANDREW J. SKINNER.